Figure 1:
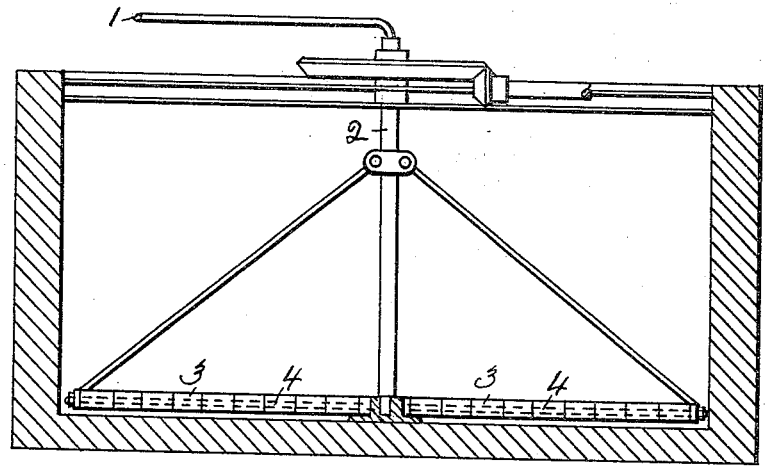

G. W. MOTTRAM.
APPARATUS FOR INTRODUCING GASES INTO INTIMATE CONTACT WITH LIQUID SEWAGE.
APPLICATION FILED FEB. 17, 1916.

1,195,067.

Patented Aug. 15, 1916.

Inventor.
George W. Mottram,
by Herbert W. Jenner.
Attorney.

UNITED STATES PATENT OFFICE.

GEORGE WILLIAM MOTTRAM, OF DEEPCAR, NEAR SHEFFIELD, ENGLAND.

APPARATUS FOR INTRODUCING GASES INTO INTIMATE CONTACT WITH LIQUID SEWAGE.

1,195,067.  Specification of Letters Patent.  Patented Aug. 15, 1916.

Application filed February 17, 1916. Serial No. 79,000.

*To all whom it may concern:*

Be it known that I, GEORGE WILLIAM MOTTRAM, subject of the King of Great Britain and Ireland, and resident of Deepcar, near Sheffield, in the county of York, England, have invented certain Improvements in Apparatus for Introducing Gases into Intimate Contact with Liquid Sewage, of which the following is a specification.

My invention relates to improvements in apparatus for introducing air or other gases into intimate contact with liquid sewage, the object being to provide means for treating the whole of the sewage as uniformly as possible.

My invention has part reference to that type of apparatus in which the air or gas is passed through porous stone or earthenware prior to coming into contact with the liquid sewage but is not confined entirely to this type of apparatus.

My invention comprises the employment of a mechanically rotated vertical supply pipe for the air or gas, perforated pipes projecting therefrom at its lower end or plain pipes or rods in place of the perforated pipes and the combination with the latter, and with the perforated pipes, if required, of tubes of earthenware wholly or partially porous through which the air or gas can be passed. My invention also comprises the employment of perforated pipes with or without earthenware or like tubes of the character referred to, or plain rods or plain tubes combined with such earthenware or like pipes adapted to be reciprocated in the tank containing the liquid sewage, means being provided if required for raising the pipes within the tank and of lowering them from a raised position if required.

In order to insure the most thorough infusion when passing air or gases into liquid sewage for oxidation, purification, absorption, saturation, decomposition or other purposes it is essential that the air or gases shall be in a finely divided condition *i. e.,* in minute bubbles and brought into intimate contact with every portion of the liquid. In circular tanks I insure this result by introducing the gas or gases under pressure through a vertical hollow shaft so mounted in the center of the tank as to be easily rotated in the liquid. Attached to and radiating from the hollow shaft are a number of porous or perforated tubular horizontal arms situate at or near the bottom of the tank. These arms may be supported at their outer ends by stays from the vertical shaft. The hollow vertical shaft is rotated by means of machinery through gearing motor or other suitable means either from above or below the level of the liquid.

In a rectangular tank the gas or gases are passed through the pores or perforations of a pipe or pipes stretched across the floor of the tank and reciprocated by means of a suitable gearing and motor. The pipe or pipes are suspended in the tank from carriages or brackets at the ends with flanged wheels running on rails fixed on the top of the walls of the tank. In a modification the pipe or pipes are supported by flanged wheels running upon rails fixed on the floor of the tank.

For the gas diffusing arms, tubes or pipes I use perforated metal tubes.

In a modification I use perforated metal tubes surrounded by an annular ring or cylinder of porous pipes or tubes having projections or ribs on the inner side as distance pieces, thus forming an annular space between the inner and outer tubes for the passage of the gas or gases. The joints of the porous pipes or tubes are made gas tight by means of rubber rings or other suitable packing or cement and tightened by nuts and washers fixed on the ends of the perforated metal tubes. The porous pipes are preferably made with certain longitudinal sections porous and the remaining portion of each pipe vitreous or only slightly porous, so that the gas or gases can be discharged in any direction by turning the porous section in the required direction. When the porous pipes are subjected to a grinding or abrading action due to the presence of solids on the floor of the tank the vitreous and more durable portion of the pipe can be placed on the underside. The porous pipes need not necessarily be circular but can be made any section or shape. The porous pipes may be made uniformly porous.

In another modification the inner tube or arm may be a plain metal tube or solid rod.

Suitable means for raising and lowering the gas diffuser arms or pipes in the liquid may be adopted.

In another modification I actuate the rotating or traveling gas diffusers by means of compressed gas or gases the exhaust being connected with the gas diffusing arms or pipes and passed into the liquid.

An auxiliary supply of gas which may be of a different nature to that used for the propulsion of the apparatus may be introduced to assist in the gas diffusion if required.

In the purification of sewage by aeration either with or without the presence of suitable bacteria the solid matters if present and liquid are kept in constant circulation by the motion of the traveling or rotating gas diffusers as well as by the diffusion of the gas or gases introduced.

The apparatus as described is suitable for sewage purification but it is obvious there are many other processes to which it may be applied with or without modification.

The apparatus described will be understood by practical men, but I have annexed diagrams illustrating the construction and application to circular and rectangular tanks.

Figure 2:
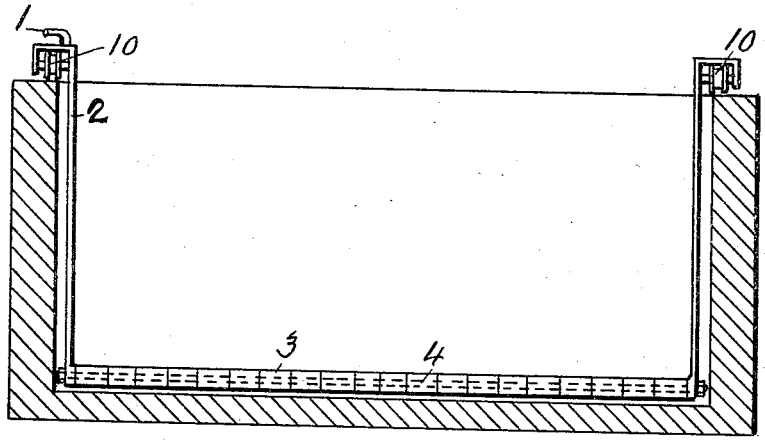
Figures 3, 4:
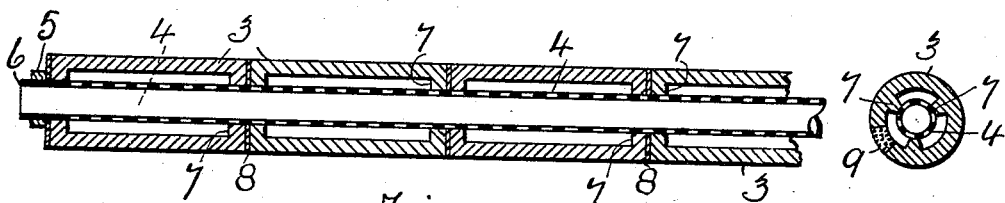

Figure 1 is a vertical section of a circular tank and shows the gas supply pipe connected by any approved means to the revolving vertical hollow shaft 2. The diffuser arms are represented by the tubes or pipes 3 and 4, Fig. 2 is a vertical cross section of a rectangular tank. 1 is the gas supply pipe connected to a flexible tube from the main gas supply to allow for the movement of the reciprocating diffuser and fitted to the vertical pipe 2 which runs on traveling wheels 10 and from which is suspended the gas diffuser formed by the tubes or pipes 3 and 4, Fig. 3 is a longitudinal section of part of a diffuser arm, 3 is the porous pipe surrounding the inner metal tube or rod 4. The nut 5 and washer fit on the screwed end 6 and tighten the joints made by the rings, washers or cement shown at 8. The projecting pieces or ribs are shown at 7.

Fig. 4 is a section of a diffuser showing a stoneware pipe surrounding an inner metal tube or rod 4. The projections or ribs on the inner side of the stoneware pipe, acting as distance pieces for centering the inner tube or rod are shown at 7, and 9 is the longitudinal section of porous material through which the gas is forced. The projections 7 may be arranged on the rod 4 instead of on the porous pipes.

What I claim as my invention and desire to secure by Letters Patent is:—

1. The combination, with a tank for sewage, of an air supply pipe supported in the lower part of the tank and provided with outlet holes, a tubular casing of porous material through which air can pass inclosing the said pipe, and means for moving the air pipe and its casing over the bottom of the tank.

2. The combination, with a tank for sewage, of a vertical air supply pipe journaled in the tank, branch air supply pipes connected to the said pipe and projecting laterally from its lower part and provided with a multiplicity of extremely small air outlets, and means for revolving the said pipes.

3. The combination, with a tank for sewage, of a vertical air supply pipe provided with laterally projecting branch pipes arranged in the lower part of the tank and provided with outlet holes, tubular casings of porous material through which air can pass inclosing the said branch pipes, and means for revolving the said pipes.

In testimony whereof I have hereunto set my hand in the presence of two witnesses.

GEORGE WILLIAM MOTTRAM.

Witnesses:
AMY E. EVINS,
WILLIAM M. TAYLOR.